(12) United States Patent
Darling et al.

(10) Patent No.: US 6,534,611 B1
(45) Date of Patent: Mar. 18, 2003

(54) CYCLOADDITION FUNCTIONAL POLYMERS FROM (VINYL) POLYSTYRENE

(75) Inventors: Graham D. Darling, Russell (CA); Brent R. Stranix, Pointe-Clair (CA)

(73) Assignee: Active Materials Inc., Ottawa (CA)

( * ) Notice: Subject to any disclaimer, the term of this patent is extended or adjusted under 35 U.S.C. 154(b) by 0 days.

(21) Appl. No.: 09/555,394

(22) PCT Filed: Nov. 27, 1998

(86) PCT No.: PCT/CA98/01086

§ 371 (c)(1),
(2), (4) Date: Jul. 31, 2000

(87) PCT Pub. No.: WO99/28354

PCT Pub. Date: Jun. 10, 1999

(30) Foreign Application Priority Data

Nov. 28, 1997 (CA) .............................................. 2222837

(51) Int. Cl.[7] .............................................. C08F 236/00
(52) U.S. Cl. ....................... 526/338; 526/261; 526/265; 526/272; 526/336; 526/337
(58) Field of Search ................................ 526/272, 261, 526/265, 336, 337, 338

(56) References Cited

U.S. PATENT DOCUMENTS

| | | |
|---|---|---|
| 3,884,882 A | 5/1975 | Caywood, Jr. |
| 4,654,267 A | 3/1987 | Ugelstad et al. |
| 5,414,094 A | 5/1995 | Csapilla |

FOREIGN PATENT DOCUMENTS

| | | |
|---|---|---|
| EP | 0152780 A | 8/1985 |
| EP | 0304377 A | 2/1989 |
| EP | 0500239 A | 8/1992 |
| WO | WO9608949 A | 3/1996 |

OTHER PUBLICATIONS

Hinch, J.C., "Reaction of Maleimidomethylated Polystyrene with Hexachlorocyclopentadiene," *Journal of Applied Polymer Science*, 24(7); 1771–1773 (1979).

Look, M., "Hexachlorocyclopentadiene Adducts of Aromatic Compounds and their Reaction Products," *Acta*, vol. 7, No. 2, pp. 23–29 (1974).

Alexandratos, S. and Quillen, D., "Mechanism of Polymer–Based Separations," *Reactive Polymers*, vol. 13, pp. 255–265 (1990).

Spangler, C., "Thermal [1,j] Sigmatropic Rearrangements," *Chem. Rev.*, vol. 76, No. 2, pp. 187–189 (1976).

Scott, L. and Brunsvold, W., "Double–Bond Isomers of Aromatic Compounds," *J. Org. Chem.*, vol. 44, No. 4, p. 641 (1979).

Hinch, J. and Stevens, M., "Reaction of Maleimidomethylated Polystyrene with Hexachlorocyclopentadiene," *Journal of Applied Polymer Science*, vol. 24, pp. 1771–1773 (1979).

Stranix, B. and Darling, G., "Functional Polymers from (Vinyl) polystyrene. Diels–Alder Reactions with Olefins," *J. Org. Chem.*, vol. 62, No. 26, pp. 9001–9004 (1997).

Bartholin, M., et al., "Revisited IR Analysis," *Makromol. Chem.*, vol. 182, pp. 2075–2085 (1981).

Brunelet, T, et al., "Functionalized Resins, 2: Grafting of Functionalized Monomers on Macroporous Styrene–Divinyl Benzene Resins," *Die Angewandte Makromoledulare Chemie*, vol. 106, pp. 79–90 (1982).

Farrall, M., et al., "Chemically Modified Polystyrene Containing Pendant Vinyl Groups; a Photosensitive Polymer Exhibiting Chemical Amplificiation," *Polymer*, vol. 24, pp. 114–116 (1983).

Yamamizu, T., et al., "A New Styrene Derivative and its Application to Reactive Polymer Synthesis," *Reactive Polymers*, vol. 3, pp. 173–179 (1985).

Nagasaki, Y., et al., "Soluble Poly (divinylbezene): Reaction Mechanism for the Anionic Polymerization of Divinylbezene with Lithium Diisopropylamide as a Catalyst," *Makromol. Chem.*, vol. 187, pp. 23–37 (1986).

Deratani, A., et al., "Heterocyclic Polymers as Catalysts in Organic Synthesis. Effect of Macromolecular Design and Microenvironment on the Catalytic Activity of Polymer–Supported (Dialklamino) Pyridine Catalysts," *Macromolecules*, vol. 20, No. 4, pp. 767–772 (1987).

Faber, M., et al., "Polymer–Bound Thiamine Models. A Simple Synthetic Route to Immobilize a Thiazolium Salt to Macroreticular Polystyrene Resins Via a Dimethylene Spacer," *Reactive Polymers*, vol. 11, pp. 117–126 (1989).

Benham, J., and Kinstle, J., eds., *Chemical Reactions on Polymers*, American Chemical Society, pp. 24–36 (1986).

Zhengpu, Z., et al., "Reactions of Benzaldehyde with Diethylzinc Catalysed by a Novel Type of Polymer–Supported N–Benzyl or N–Alkyl (1S, 2R)—Ephedrines," *Reactive Polymers*, vol. 15, pp. 71–77 (1991).

Gao, J., et al., "Functional Polymers Containing Dimethylene Spacers," *Macromolecules*, vol. 26, No. 5, pp. 1196–1198 (1993).

(List continued on next page.)

*Primary Examiner*—Helen L. Pezzuto
(74) *Attorney, Agent, or Firm*—Klarquist Sparkman, LLP

(57) ABSTRACT

A functional polymer having active and stable functional groups useful for separation or reactive processes in chemical manufacture or analysis is disclosed. The polymer comprises repeat units having structures corresponding to cycloaddition products of polymeric 1-(vinylphenyl) ethylene with electron-poor alkenes. A process for preparing the functional polymer does not require radical reactions or the exclusion of oxygen. The properties of the polymeric matrix produced can be adjusted by modifying the polymer. For example, the polymer particle size and shape, porosity, swellability, surface area, and number, type and distribution of functional groups may be controlled.

9 Claims, 3 Drawing Sheets

OTHER PUBLICATIONS

Viklund, C., et al., "Monolithic, "Molded", Porous Materials with High Flow Characteristics for Separations, Catalysis, or Solid–Phase Chemistry: Control of Porous Properties During Polymerization," *Chem. Mater.*, vol. 8, No. 3, pp. 744–750 (1996).

Stranix, B., *Functional Polymers From (Vinyl) Polystyrene. Solid–Phase Reagents, Catalysts, Suport and Fluorescent Sensors*, Thesis submitted at McGill University, Montreal, Quebec (1997).

Sherrington, D. and Hodge, P., *Syntheses and Separations Using Functional Polymers*, John Wiley & Sons (1988).

Trivedi, B., *Maleic Anhydride*, Plenum Press, pp. 462–465 (1982).

Obrecht, W. et al., "Reaktive Mikrogele, 5," *Makromol. Chem.*, vol. 177, pp. 2235–2241 (1976).

Wagner–Jauregg, T., "Thermische und Photochemische Additionen von Dienophilen an Arene sowie deren Vinyloge und Hetero–Analoge," Synthesis, pp. 769–775 (Oct. 1980).

CYCLOADDITION FUNCTIONAL POLYMERS FROM (VINYL) POLYSTYRENE

TECHNICAL FIELD

This invention relates to a functional polymer comprising active and stable functional groups, and to a method of preparing the same. More particularly, the present invention relates to a functional polymer that comprises repeat units having structures corresponding to end products of cycloaddition between polymeric 1-(vinylphenyl)ethylene repeat units and an electron-poor alkene, and also to the cycloaddition method of its preparation.

BACKGROUND ART

Functional polymers are widely used in industry as separation media and as solid-phase reagents, catalysts and protecting groups for analytical or preparative chemical applications and processes [D. C. Sherrington and P. Hodge, "Syntheses and Separations Using Functional Polymers", John Wiley & Sons, Toronto, 1988]. A functional polymer generally consists of a polymer matrix, in the form of particles, beads or a porous block [C. Viklund, F. Svek, J. M. J. Fréchet and K. Irgum, "Molded porous materials with high flow characteristics for separation or catalysis: control of porous properties during polymerization in bulk solution", Chem. Mater. y1986 v8 p744–750], that is chemically inert to the conditions of its use, including being insoluble in any solvent it is likely to encounter so that it can be retained in a column or easily recovered from out of a product mixture by filtration or other separation for easy isolation of chemical product and reuse of the functional polymer; and also of functional groups, attached to the polymer matrix, that can bind, transform or otherwise interact with chemical species that are dissolved in a permeating fluid, or that confer other advantageous properties to the functional polymer, such as a higher density for best use in floating bed reactors or for easier and faster separation by precipitation, or better wetting and penetration by a particular solvent. Most often, the polymer matrix is of crosslinked polystyrene, due to the ease of its preparation through suspension or other polymerization of styrene or styrene-like monomer (usually, including divinylbenzene as crosslinking agent), with attendant control of particle size, porosity, swellability, surface area, and other aspects of its architecture affecting eventual use; and its good general mechanical and chemical stabilities, though also with the ability to be controllably decorated with any of a wide variety of functional groups. In ion exchange resins, which are manufactured in large quantities for deionizing water and many other purification processes, these functional groups may consist of sulfonic, carboxylic or phosphonic acids or their salts, or amines or their salts, or quaternary ammonium or phosphonium hydroxides or other of their salts; chelating resins that recover toxic or expensive metal ions from wastewater may contain combinations of amino and sulfonate, phosphonate or carboxylate groups, along with hydroxyl, ether, thiol, sulfide, phosphine or other Lewis base groups; certain of these groups may also coordinate with metal ions to activate their negative counterions for phase transfer catalyzed nucleophilic substitution or other reactions, or may hold platinum or other catalytic heavy metal species so that these are conserved and re-used from one reaction to the next; halosilyl, haloalkyl, haloacyl or halosulfonyl functional groups, or anhydride or azlactone functional groups, can covalently bind to other organic molecules so that parts of these are protected while other parts are being chemically modified, the whole later released, such as in solid-phase synthesis of polypeptides, polysaccharides or polynucleotides, or themselves act as agents for catalysis or molecular recognition, as with enzymes, antibodies or antigens that have been polymer-bound. Halogen-rich functional groups can improve sorption in a functional polymer [Specialty Polymers Division, "Manual of ion exchange resins and synthetic adsorbent", Mitsubishi Kasei Corporation: Tokyo, Japan y1991 v1 p123–1321], and increase its fire-resistance, and density for separation by precipitation, while ferrous/ferric oxide precipitated around carboxylate groups can allow polymer particles to be recovered magnetically from mixtures [J. Ugelstad, U.S. Pat. No. 4,654, 267 y1987].

While functional polymers may be prepared by polymerization of monomers that already contain the desired functional groups, more commonly they are made by chemically functionalizing or modifying other existing polymer matrices—most commonly, crosslinked polystyrene—as prepared from common monomers through established polymerization recipes that give well-defined and desirable particle and matrix structures and properties. However, existing such modification methods of preparing functional polymers often suffer from disadvantages of hazardous or expensive ingredients or conditions, that result in products that are intrinsically deficient in activity or stability or both [G. D. Darling and J. M. J. Fréchet "Dimethylene spacers in functionalized polystyrenes", in J. L. Benham and J. F. Kinstle, Eds. "Chemical Reactions on Polymers", ACS Symp. Ser. v364, American Chemical Society, Washington DC, y1988 p24–36]. For example, the chloromethylation route to the most common anion-exchange and chelating polystyrene-based resins uses or generates highly carcinogenic species, and results in benzyl-heteroatom bonds that are unstable to many conditions of eventual use or regeneration; bromination/lithiation, another general route to functional polymers, employs expensive and sensitive organometallic reagents and, like sulfonation, results in aryl-heteroatom functional groups that may be unstable in acidic conditions. Functional polymers containing aliphatic spacer groups of at least two carbons between polystyrene phenyl and functional group heteroatom would not show either type of chemical instability, and moreover, the deeper penetration of their dangling functional groups into a fluid phase permeating the polymer matrix often allows better and faster interactions with soluble species therein [A. Deratani, G. D. Darting, D. Horak and J. M. J. Fréchet "Heterocyclic polymers as catalysts in organic synthesis. Effect of macromolecular design and microenvironment on the catalytic activity of polymer-supported (dialkylamino)pyridine catalysts." Macromolecules y1987 v20 p767]. Several such spacer-containing functional polymers have been prepared via electrophilic aromatic substitution—either chloromethylation or bromination/lithiation—of aryl nuclei in crosslinked styrene-divinylbenzene copolymer, albeit through tedious multistep syntheses [Darling and Fréchet y1988 ibid].

Instead of on styrenic phenyl, modification reactions can be performed on the vinyl groups of polymeric 1-(vinylphenyl)ethylene repeat units. These vinyl groups may be prepared from formyl, chloromethyl, bromoethyl or 1,2-dibromoethyl functional group precursors [M. J. Farrell, M. Alexis and M. Trecarten, Polymer y1983 v24 p114; Darling and Fréchet y1988 ibid; T. Yamamizu, M. Akiyama and K. Takeda, React. Polym. y1985 v3 p173], or remain from anionic [Y. Nagasaki, H. Ito, T. Tsuruta, Makromol. Chem. y1968 v187 p23] or even free-radical [M. C. Faber, H. J. van den Berg, G. Challa and U. K. Pandit, React. Polym. y1989 v11 p117] copolymerization of monomer mixtures that include divinylbenzene. Radical copolymerization with divinylbenzene is a particularly simple way to form a polymer that contains such vinyls, that moreover have here the advantage of being site-isolated; indeed, Rohm and Haas supplies a commercial product, "Amberlite® XAD-4 nonionic polymeric adsorbent", which analysis thereof indicates to be undoubtedly made by radical copolymerization of a mixture of divinylbenzene and ethylstyrene—which mixture, containing both meta and para isomers of each, is commercially provided under the name "technical-grade divinylbenzene" ["Aldrich Catalog" y1997], and so which resulting polymer may be called "poly(divinylbenzene)"—and which contains 30 mol % of polymeric 1-(vinylphenyl)ethylene repeat units, with the remaining repeat units consisting of polymeric 1-(ethylphenyl)ethylene and crosslinking polymeric bis (ethylene)phenyl repeat units [Faber et al y1989 ibid]. Through electrophilic, nucleophilic, radical, transition-metal catalyzed or other additions to such polymeric 1-(vinylphenyl)ethylene repeat units [W. Obrecht, Y. Seitz and W. Funke, Makromol. Chem, y1976 v177 p2235; Faber et al y1989 ibid; Z. Zhengpu, P. Hodge and P. W. Stratford, React. Polym. y1991 v15 p71; J. P. Gao, F. G. Morin and G. D. Darling, Macromolecules y1993 v26 p1196], or by their radical-induced graft copolymerizations with various monomers [T. Brunelet, M. Bartholin and A. Guyot, Angew. Makromol. Chem. y1982 v106 p79], have been provided a wide variety of functional groups, including of the form Ps-CH$_2$—CH$_2$—X, wherein Ps represents a crosslinked polystyrene matrix connecting through phenyl, and X a functional group connecting through a heteroatom, that features advantageous dimethylene spacer [Gao et al y1993 ibid].

Useful electron-withdrawing functional groups such as halo or carboxylate may be incorporated into functional polymers through polymerizations with haloalkene, acrylic, methacrylic, maleate or fumarate comonomers. As previously mentionned though, modification of an existing optimal polymer matrix is a route often to be preferred for its simplicity, versatility, economy and better product properties. Though individual molecules of such electron-poor alkenes as maleic anhydride have been grafted onto uncrosslinked polymers to provide functionality for crosslinking and other modifications, or improve adhesion, hydrophilicity, and compatibility with other materials, both onto saturated polyalkanes like polyethylene and polypropylene in the presence of free radicals [S. W. Caywood Jr., U.S. Pat. No. 3,884,882, y1975], and onto —CH<-substituted alkene groups left in conjugated diene copolymers by non-radical ene reactions [B. C. Trivedi and B. M. Culbertson, "Maleic Anhydride", Plenum: New York, 1982, Chapter 11]; and though non-polymeric vinylphenyl compounds have been made to undergo cycloadditions with maleic anhydride [Joseph Csapilla, U.S. Pat. No. 5,414,094, y1995] and hexachlorocyclopentadiene [M. Look, Aldrichim. Acta y1974 v7 p23$_{14\ 29}$]; and though the products of cycloaddition between polymeric (1-vinylphenyl)ethylene repeat units and electron-poor alkenes would provide a wide variety of useful functional groups on attractive and controllable polymer matrices, derived via relatively simple procedures from available starting materials—the prior art has no examples of polymeric (1-vinylphenyl)ethylene groups being modified by cycloadditions with the forementionned or any other alkenes, nor are the useful products that would be characteristic of such reactions known by any other route.

OBJECTS OF THE INVENTION

It is an object of this invention to provide a functional polymer comprising repeat units having structures corresponding to end products of cycloaddition of polymeric 1-(vinylphenyl)ethylene repeat units with an electron-poor alkene for separation or reactive processes in chemical manufacture or analysis.

It is another object of this invention to provide a functional polymer that can be prepared using readily-available materials and simple conditions and apparatus.

It is another object of this invention to provide a functional polymer, the architecture of whose polymer matrix (e.g. particle size and shape, porosity, swellability, surface area), and type, arrangement and number of whose functional groups, can be controlled.

It is another object of this invention to provide a functional polymer whose functional groups are stable, active, and accessible to a permeating fluid.

It is another object of this invention to provide a functional polymer bearing functional groups that are halo, heterocycle, carboxylic anhydride, carboxyl halide, carboxylic acid, carboxylate salt, ester, amide, imide, or polymer-supported ion, polynucleotide, polypeptide, polysaccharide, enzyme, antibody or antigen, or combinations thereof, in type, arrangement and number sufficient to confer or contribute towards acidity, basicity, ion exchange, fire-resistance, wettability, chelation, extraction, separation, sorption, density, permeability, catalysis, selectivity, hydrophilicity, reactivity, seperability, suspendability, binding of ions, binding of organic molecules, binding of polypeptides, binding of polysaccharides, binding of polynucleotides, molecular recognition, filterability, convertability to other functional groups, or other desirable qualities, or combinations thereof, in a separation medium, chromatographic medium, purification medium, ion-exchange medium, chelating medium, solid-phase reagent, solid-phase catalyst, solid-phase protecting agent, support for solid-phase synthesis, chemical intermediate, or other application of a functional polymer, or combinations thereof.

SUMMARY OF THE INVENTION

In accordance with the invention there is provided a functional polymer that comprises repeat units having structures corresponding to end products of cycloaddition between polymeric 1-(vinylphenyl)ethylene repeat units and an electron-poor alkene.

In accordance with another aspect of the invention there is a provided a functional polymer that can be prepared by heating a preexisting polymer comprising polymeric 1-(vinylphenyl)ethylene repeat units with an electron-poor alkene, without need of radicals or exclusion of oxygen.

In accordance with a preferred embodiment of the invention there is provided a method of preparing a functional polymer, by heating a polymer that comprises polymeric 1-(vinylphenyl)ethylene repeat units with an electron-poor alkene dissolved in a fluid that permeates said polymer.

In accordance with a preferred embodiment of the invention there is provided a functional polymer that has been prepared by heating a pre-existing polymer comprising polymeric 1-(vinylphenyl)ethylene repeat units with an electron-poor alkene.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, that were derived by chemical modification of structures corresponding to end products of cycloaddition between polymeric 1-(vinylphenyl)ethylene repeat units and another electron-poor alkene.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, that were derived by reaction of a nucleophile with structures corresponding to end products of cycloaddition between polymeric 1-(vinylphenyl)ethylene repeat units and maleic anhydride.

In accordance with a preferred embodiment of the invention there is provided a functional polymer that comprises repeat units having structures corresponding to end products of cycloaddition between polymeric 1-(vinylphenyl) ethylene repeat units of a radical copolymer of monomers comprising divinylbenzene, and an electron-poor alkene.

In accordance with a preferred embodiment of the invention there is provided a functional polymer that comprises repeat units having structures corresponding to end products of cycloaddition between polymeric 1-(vinylphenyl) ethylene repeat units of a radical copolymer of monomers consisting of meta-divinylbenzene and para-divinylbenzene and meta-ethylstyrene and para-ethylstyrene, and an electron-poor alkene.

In accordance with a preferred embodiment of the invention there is provided a functional polymer that comprises repeat units having structures corresponding to end products of cycloaddition between polymeric 1-(vinylphenyl) ethylene repeat units and an alkene, wherein one or more of the olefinic carbons thereof are substituted with groups that withdraw electrons by induction or resonance.

In accordance with a preferred embodiment of the invention there is provided a functional polymer that comprises repeat units having structures corresponding to end products of cycloadditioh between polymeric 1-(vinylphenyl) ethylene repeat units and a conjugated diene capable of cisoid conformation, wherein one or more of the olefinic carbons thereof are substituted with groups that withdraw electrons by induction or resonance.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, said end products having incorporated one mole of said alkene per said repeat unit.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, said end products having incorporated two moles of said alkene per said repeat unit.

In accordance with a preferred embodiment of the invention there is provided a functional polymer that comprises repeat units having structures corresponding to end products of cycloaddition between polymeric 1-(vinylphenyl) ethylene repeat units and an electron-poor alkene selected from maleic anhydride, maleimide, N-alkylmaleimide wherein "alkyl" is selected from methyl, ethyl, n-propyl, i-propyl, n-butyl, i-butyl, s-butyl and t-butyl; of the form X—CO—CH=CH—CO—Y whose geometry is selected from cis and trans and wherein X and Y are selected from Cl, O$^-$, OR$^1$ and NR$^1$R$^2$ wherein R$^1$ and R$^2$ are selected from H, Me, Et, nPr, iPr, nBu, iBu, sBu, tBu, an amino acid residue of a polypeptide a carbohydrate residue of a polysaccharide, and a nucleotide residue of a polynucleotide; hexachlorocyclopentadiene, and 3,6-di-2-pyridyl-1,2,4,5-tetrazine.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, which said functional polymer also comprises other functional groups.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, which said functional polymer also contains magnetic iron oxide.

In accordance with a preferred embodiment of the invention there is provided a functional polymer that comprises repeat units having structures corresponding to end products of cycloaddition between polymeric 1-(vinylphenyl) ethylene repeat units and an electron-poor alkene, said structures comprising one or more functional groups selected from halo, heterocycle, carboxylic anhydride, carboxyl halide, carboxylic acid, carboxylate salt, ester, amide, imide, or polymer-supported ion, polynucleotide, polypeptide, polysaccharide, enzyme, antibody or antigen; which said functional groups are in type, arrangement and number to confer or contribute towards one or more qualities in said functional polymer selected from acidity, basicity, ion exchange, fire-resistance, wettability, chelation, extraction, separation, sorption, density, permeability, catalysis, selectivity, hydrophilicity, reactivity, separability, suspendability, binding of ions, binding of organic molecules, binding of polypeptides, binding of polysaccharides, binding of polynucleotides, molecular recognition, filterability, or convertability to other functional groups; which qualities are such as to allow or improve for one or more uses selected from separation medium, chromatographic medium, purification medium, ion-exchange medium, chelating medium, solid-phase reagent, solid-phase catalyst, solid-phase protecting agent, support for solid-phase synthesis, and chemical intermediate.

BRIEF DESCRIPTION OF THE DRAWINGS

Preferred embodiments of the present invention are shown in the figures, wherein.

DESCRIPTION OF PREFERRED EMBODIMENTS

Figure 1:
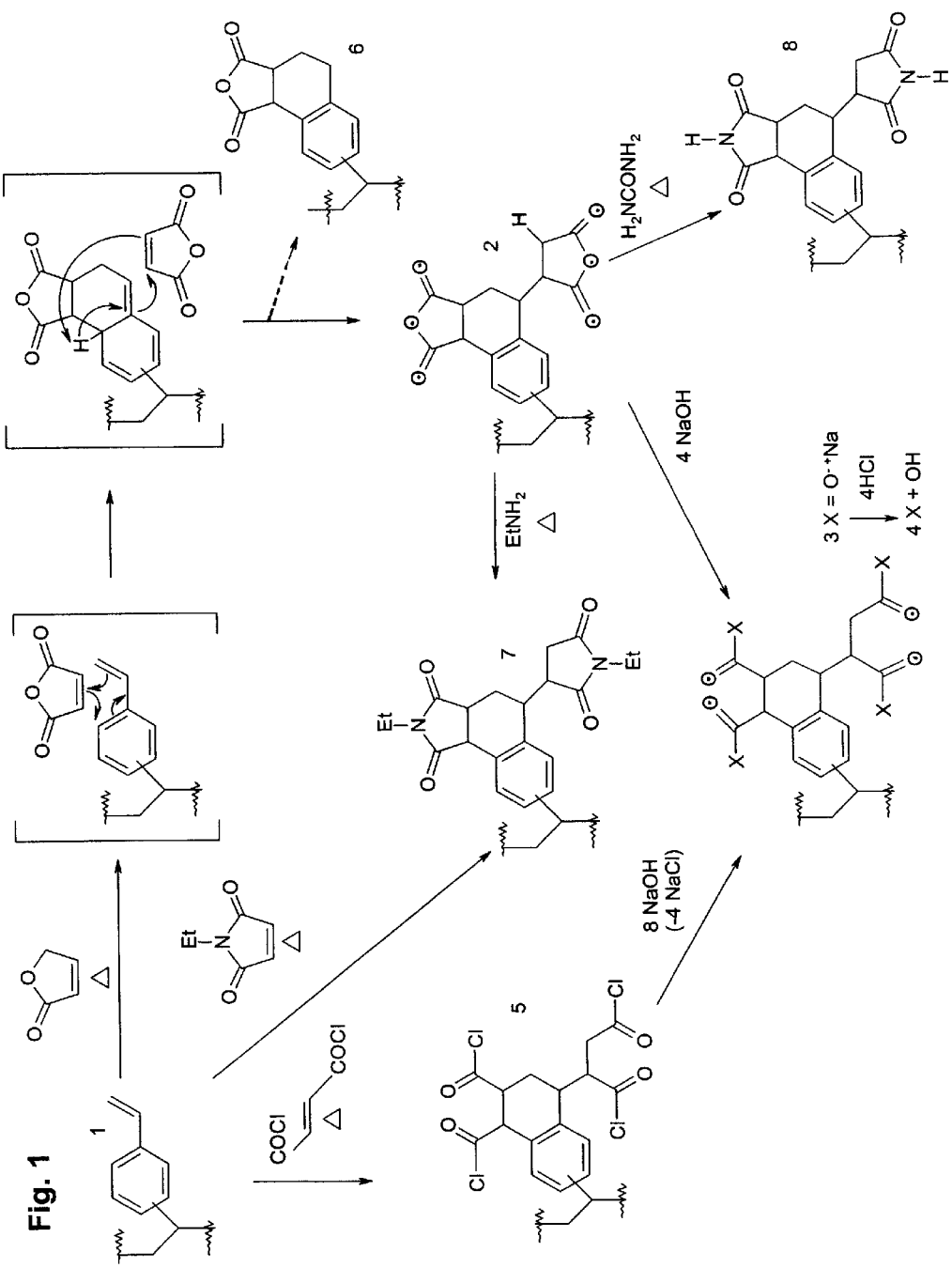
FIG. 1 shows embodiments of the invention 2–8, showing repeat units having structures corresponding to end products of cycloaddition of polymeric 1-(vinylphenyl)ethylene repeat units of polymeric 1-(vinylphenyl)ethylene-containing polymer 1 with electron-poor alkenes, each either prepared by actual cycloaddition between polymeric 1-(vinylphenyl)ethylene repeat units of polymeric 1-(vinylphenyl)ethylene-containing polymer 1 with an electron-poor alkene (mechanism shown for maleic anhydride, to give embodiment 2), or in some other fashion, or both (e.g. 3 and 7) [stereochemistry not shown]
Figure 2:
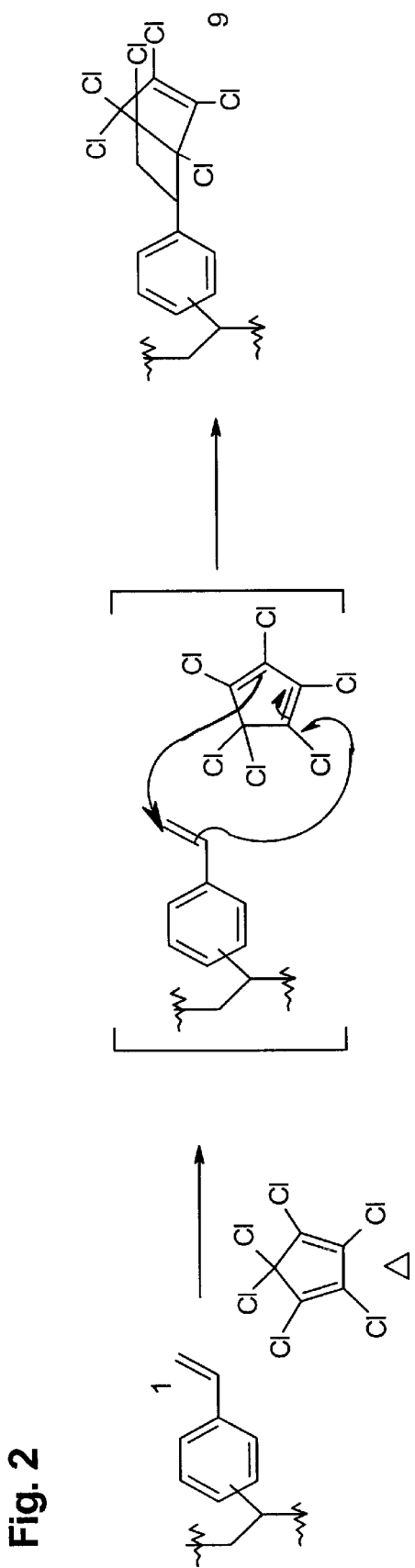
FIG. 2 shows cycloaddition of polymeric 1-(vinylphenyl) ethylene repeat units of polymeric 1-(vinylphenyl)ethylene-containing polymer 1 with hexachlorocyclopentadiene electron-poor alkene, to give an embodiment of the invention 9.
Figure 3:
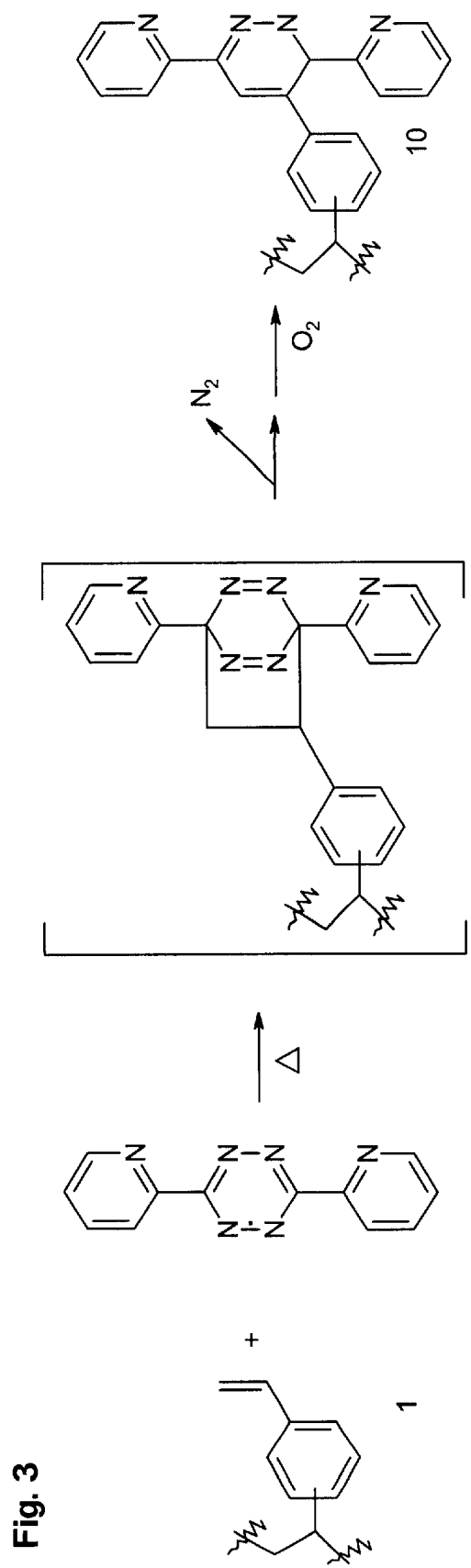
FIG. 3 shows cycloaddition of polymeric 1-(vinylphenyl)ethylene repeat units of polymeric 1-(vinylphenyl)ethylene-containing polymer 1 with 3,6-di-2-pyridyl-1,2,4,5-tetrazine electron-poor alkene, to give an embodiment of the invention 10.

Vinylphenyl of polymeric 1-(vinylphenyl)ethylene repeat units is an electron-rich electron system such as are typically reactive with electron-poor electron systems for cycloaddition. When the electron-poor alkene of the invention is other than a conjugated diene capable of cisoid conformation, then typically it will react as the dienophile, and the vinyl and one adjacent internal double bond in the phenyl of a polymeric 1-(vinylphenyl)ethylene repeat unit of the invention will react as the diene, in a Diels-Alder type of cycloaddition that will link the electron-poor alkene moiety and its functional groups to the polymer by two stable covalent bonds. This first reaction step disrupts the aromaticity of said phenyl, which aromaticity however can then be restored by a subsequent ene reaction step (also formally a cycloaddition) in which a second molecule of electron-poor alkene becomes joined to the polymer by a single stable covalent bond, for a total of two molecules of electron-poor alkene binding to polymer for every reacting polymeric 1-(vinylphenyl)ethylene repeat unit (e.g. see FIG. 1, mechanism leading to structure 2; Examples 1, 2, 4, 5 below). Though aromaticity of phenyl could also be restored by a 1,3 hydride shift without addition of a second molecule of electron-poor alkene (e.g. giving structure 6 in FIG. 1), in fact such a rearrangement is forbidden as a concerted reaction by the rules of orbital symmetry [C. W. Spangler, Chem. Rev. y1976 v76 p187–217] (though another mechanism might be possible were acid catalyst to be present [L. T. Scott and W. R. Brunsvold, J. Org. Chem. y1979 v44 p641]), and the observed stoichiometry of the reaction, as shown by quantitative analysis of polymeric 1-(vinylphenyl) repeat units in starting polymer vs functional groups in functional polymer product, and by analogous reactions of vinylphenyl small molecules [T. Wagner-Jauregg, Synthesis y1980 p779–799], suggests the former route is dominant. Structures of products are also supported by NMR and FTIR data (e.g. showing trialkylphenyl). When the electron-poor alkene of the invention is a conjugated diene capable of cisoid conformation (e.g. see FIGS. 2 and 3, structures 9 and 10; Examples 8 and 9 below), then in the cycloaddition of the invention it acts as the diene, and the vinyl of a polymeric 1-(vinylphenyl)ethylene repeat group as the dienophile, and the stoichiometry is 1:1, as is also supported by quantitative and other analyses.

Excess of electron-poor alkene may be used, and reaction continued, until all polymeric 1-(vinylphenyl)ethylene repeat units in the starting polymer have been consumed, giving 30 mol % or more of polymeric repeat units having a structure corresponding to end products of cycloaddition of polymeric 1-(vinylphenyl)ethylene repeat units with that electron-poor alkene, when starting from polymers with sufficient polymeric 1-(vinylphenyl)ethylene repeat units, such as certain poly(divinylbenzene) copolymers including commercial Amberlite® XAD-16 (Example 1 below); or a limited amount of electron-poor alkene may be employed, or the reaction terminated early, so that less than the maximum possible of polymeric 1-(vinylphenyl)ethylene repeat units have undergone cycloaddition with the electron-poor alkene, and some polymeric 1-(vinylphenyl)ethylene repeat units remain, which can either be left unreacted, or can be made to react with a different electron-deficient alkene of the invention, or made to undergo some other reaction, either at the same or some later time. Cycloaddition of the invention may also be pursued before, after or simultaneous with other modifications of a starting polymer, such as impregnation with magnetic iron oxide (Example 2 below). Also, structures corresponding to end products of cycloaddition of polymeric 1-(vinylphenyl)ethylene repeat units with one electron-poor alkene, may be chemically modified to give other structures corresponding to end products of cycloaddition of polymeric 1-(vinylphenyl)ethylene repeat units with another electron-poor alkene, and so which other structures are also embodiments of the invention, regardless of their actual route of preparation (e.g. structures 3 and 7 in FIG. 1; Examples 36 below). In particular, cyclic anhydride containing structure 2, where the electron-poor alkene of the invention is maleic anhydride, is a particularly versatile intermediate towards other structures of the invention, being able to react with nucleophiles such as water, hydroxide, carboxylates, alcohols or amines, including polypeptides, polysaccharides or polynucleotides, to provide functional groups that are carboxylic acids, carboxylate salts, esters, amides, or (with actual or latent primary amines, and forcing conditions) imides, including supported polynucleotides, enzymes, antibodies or antigens, or combinations thereof (see structures 3, 4, 7 and 8 in FIG. 1; Examples 3, 6, 7 and 11 below). Such chemical modifications may also be complete or partial—for example, a polypeptide, polysaccharide or polynucleotide may need only be supported on a very small fraction of total repeat units to provide a useful solid-phase catalyst or agent for molecular recognition. In all these ways, a functional polymer of the invention that comprises particular repeat units having structures corresponding to end products of cycloaddition of polymeric 1-(vinylphenyl)ethylene repeat units with an electron-poor alkene, may or may not comprise other repeat units having structures corresponding to end products of cycloaddition of polymeric 1-(vinylphenyl)ethylene repeat units with one or more other electron-poor alkenes, and may or may not comprise other repeat units having other structures or functional groups, possibly contributing other desirable qualities of density, solvent wettability or permeability, dispersability, stabilization of magnetic or other loaded particles, buffering capacity, or other desirable qualities, or combinations thereof.

In the examples below, various qualities and utilities of several preferred embodiments the invention are demonstrated: 2 and 5 as chemical intermediates, protection agents, and for covalently binding and supporting organic molecules or biomoiecules (Examples 1–4, 6, 7, 10), 3 and 4 as solid-phase buffer of acid or base, and for titration analysis (Examples 1–3, 5, 10), 9 to increase polymer density (Example 8), 10 as a chelating agent (Example 9), 11 as a solid-phase catalyst (Example 10). It is apparent that modifications and adaptations of these specifically described embodiments will occur to those skilled in the art; however, it is to be expressly understood that such modifications and adaptations are within the spirit and scope of the present invention.

EXAMPLES

The following examples describe preferred embodiments of the present invention. Reagents and solvents were used as received unless otherwise indicated. Polymeric 1-(vinylphenyl)ethylene-containing poly(divinylbenzene) polymer 1a was prepared by polymerization of a divinylbenzene:ethylstyrene 55:45 mixture with toluene as porogen, and assayed for polymeric 1-(vinylphenyl)ethylene repeat units by FTIR (M. Bartholin, G. Boissier, J. Dubois, Makromol. Chem. y1981 v182 p2075–20851. Samples of commercial Amberlite® XAD-4 and XAD-16 were obtained as gifts from Supelco and, after washing in distilled water, extracting by Soxhlet with methanol, and drying, showed FT-IR spectra matching peak-to-peak that of 1a, indicating each of them also to be poly(divinylbenzene) comprising polymeric 1-(vinylphenyl)ethylene repeat units, and so were respectively denoted 1b and 1c. In general, 100–500 μm beads of 1a–c were degassed under vacuum 30–60 min, then purged with nitrogen prior to use. FT-IR spectra of dry ground samples spread onto IR-transparent silicon wafers were recorded using an IR microscope in transmittance mode. $^{13}C$ CP-MAS (cross polarization/magic angle spinning) and $^{13}C$ CP-MAS-DD (also with $\pi$=45 ms dipolar dephasing; in the peak lists following, those labeled "DD" persist here) NMR spectra were obtained on a 100 MHz solid-phase NMR spectrometer; the program "C-13 NMR Module" (Softshell, Grand Junction CO USA) helped assign the peaks. Elemental analyses were done by Robertson Microlit Laboratories (NJ). Back titrations of polymeric acid were done by presoaking the polymer beads in a measured excess of 1.00 N $NaOH_{(aq)}$:THF 5:1 for 24 h, then titrating aliquots of the supenatant with standardized 1.00 N $HCl_{(aq)}$. Ash was weighed after heating the sample in a ceramic crucible at 400° C. for 24 h, converting all iron to $Fe_2O_3$, then cooling. $X_f$ designates mole fraction of indicated repeat units among total repeat units.

Example 1

Functional polymer that comprises repeat units having structures corresponding to end products of cycloaddition of polymeric 1-(vinylphenyl)ethylene repeat units with maleic anhyndee electron-poor alkene (2). To 0.34 $X_f$ poly(divinylbenzene) beads prepared with toluene as porogen 1a (11.46 g, 32.66 mmol) was added a solution of maleic anhydride (3.50 g, 35 mmol) in 50 mL toluene (bp 111° C.). The mixture was refluxed 12 h and the beads filtered while hot. The beads were then washed with 30 mL hot toluene 9X, 30 mL acetone 7X, then ether, and dried in a vacuum oven 48 h at 60° C., yielding 14.88 g 2a as light beige beads: IR (Si wafer) 1868 (w), 1789 (s), 1728 (w), 1630 (w, weaker than 1a), 1217, 990 (w, weaker than 1a), 890–910 (br) $cm^{-1}$; $^{13}C$ CP-MAS NMR δ 171 (DD, COOCO), 145 (DD, disubstituted aryl C-R), 135 (DD, trisubstituted aryl C-R) and 127 (aryl C-H) ppm, 40, 30 and 22 ppm (alkyl CH and $CH_2$), and 15 ppm (DD, $CH_3$). Anal. Calcd for $(C_{10}H_{12})_{0.45}(C_{10}H_{10})_{0.37}$-$(C_{18}H_{14}O_6)_{0.18}$ (48% conversion): mmol acid/g, 4.33. Found: mmol acid/g (3 titrations against 1 blank), 4.33±0.17.

Refluxing, with tenfold excess maleic anhydride in o-xylene at a higher temperature (bp 120° C.), commercial Amberlite® XAD-4 beads of same 0.34 $X_f$ vinyl content 1b for the same 12 h time, gave 2b product showing titration results (mmol acid/g, 4.33±0.04) and spectra corresponding to a functional group content that was not significantly different from the polymeric 1-(vinylphenyl)ethylene content of 1a, i.e. still corresponding to 0.18 $X_f$ of bis-anhydride groups of structure 2. With Amberlite® XAD-16 beads of 0.35 $X_f$ polymeric 1-(vinylphenyl)ethylene-containing polymer 1c, titration data showed that content of bis-anhydride in 2c continued to increase, past 0.24 $X_f$ (mmol acid/g, 5.75±0.06) at 12 h, 0.28 $X_f$ (mmol acid/g, 5.94±0.04) at 25 h, up to 0.32 $X_f$ (mmol acid/g, 6.66±0.14) at 48 h, with accompanying decrease and eventual disappearance of IR peaks at 1630 and 990 $cm^{-1}$.

Example 2

Functional polymer that comprises repeat units having structures corresponding to end products of cycloaddition of polymeric 1-(vinylphenyl)ethylene repeat units with maleic anhydride electron-poor alkene (2)—magnetite-impregnated. Amberlite® XAD-16 beads of 0.35 $X_f$ polymeric 1-(vinylphenyl)ethylene-containing polymer 1c (9.00 g, 26.1 mmol) were soaked in a 100 mL methanol solution containing $FeCl_2$ (5.00 g, 40.0 mmol) and $FeCl_3$ (5.00 g, 31.0 mmol) for 12 h at room temperature in air, then filtered. The moist beads were then transferred to an Erlenmeyer flask containing 250 mL of 1 M $NH_{3(aq)}$ and boiled gently in air for 30 min. The resulting dark brown beads were then filtered over 425 mm wire mesh and washed with boiling water several times until filtrate was clear and colourless. The beads were then dried in vacuo 3 days at 75° C. until constant weight, giving 10.11 g of dark brown beads, 1d. To 4.00 g of these was added a solution of maleic anhydride (5.00 g, 50 mmol) in 30 mL o-xylene. The suspension was heated to 120° C. for 48 h and the beads filtered off while hot. The beads were then washed with 30 mL hot toluene 9X, 30 mL acetone 7X, then ether, and dried in a vacuum oven for 48 h at 60° C., yielding 4.33 g of 2d as dark brown beads: FT-IR (Si wafer) same as from 2a. Anal. Calcd for $(C_{10}H_{12})_{0.45}(C_{10}H_{10})_{0.36}(C_{18}H_{14}O_6)_{0.19}(Fe_3O_4)0.039$ (54% conversion, 5 wt % magnetite): mmol acid/g, 4.28; ash, 5.27. Found: mmol acid/g, 4.34; ash, 5.23. Similar results were obtained by impregnating, with magnetic iron oxide, beads that had already been reacted with maleic anhydride.

Example 3

Functional polymer that comprises repeat units having structures corresponding to end products of cycloaddition of polymeric 1-(vinylphenyl)ethylene repeat units with disodium maleate (3) or maleic acid (4) electron-poor alkenes. A sample of 2a was treated with aqueous base as for the pH back titration procedure, and the resulting 3a examined spectroscopically: FT-IR (KBr) 3600–100, 1572, 1406, 1217 $cm^{-1}$; $^{13}C$ CP-MAS NMR δ 184 (DD), 145 (DD), 138 (DD), 127, 40, 30, 32, 15 (DD). Back titration protonated this to 4a.

Example 4

Functional polymer that comprises repeat units having structures corresponding to end products of cycloaddition of polymeric 1-(vinylphenyl)ethylene repeat units with fumaryl chloride electron-poor alkene (5). Amberlite® XAD-16 beads of 0.35 $X_f$ polymeric 1-(vinylphenyl)ethylene-containing polymer 1c (9.00 g 26.1 mmol) were soaked in 30 mL o-xylene that had been dried over molecular sieves, then fumaryl chloride (16.01 g, 105 mmol) was added. The mixture was then heated 24 h at 120° C., then filtered hot, and the residue washed with toluene 16X, then ether, then dried in vacuo 3 days at 75° C. until constant weight, yielding 11.11 9 of 5 as tan beads: FT-IR (Si wafer) 1792, 1727 $cm^{-1}$; $^{13}C$ CP-MAS NMR δ 166, 145 (DD), 127, 40, 28, 15 (DD). Anal. Calcd for $(C_{10}H_{12})_{0.45}(C_{10}H_{10})_{0.38}(C_{18}H_{14}O_4Cl_4)_{0.17}$ (53% conversion): mmol acid/g, 7.43. Found: mmol acid/g, 7.61.

Example 5

Functional polymer that comprises repeat units having structures corresponding to end products of cycloaddition of polymeric 1-(vinylphenyl)ethylene repeat units with N-ethylmaleimide electron-poor alkene (7). By reaction of 1 with N-ethylmaleimide. Amberlite® XAD-16 beads of 0.35

$X_f$ polymeric 1-(vinylphenyl)ethylene-containing polymer 1c (2.5 g, 7.25 mmol) was soaked with 10 mL o-xylenes, and N-ethylmaleimide (2.50 g, 20.0 mmol) was then added. The mixture was heated at 120° C. for 24 h, then filtered hot, and washed with toluene 16X, then ether. The beads were then dried in vacuo 3 days at 75° C. until constant weight, yielding 3.53 g of 7 as tan beads: FT-IR (Si wafer) 1791, 1726 cm$^{-1}$; $^{13}$C CP-MAS NMR δ 166 (DD), 145 (DD), 127, 40, 28, 15 (DD). Anal. Calcd for $(C_{10}H_{12})_{0.45}(C_{10}H_{10})_{0.27}$ $(C_{22}H_{24}O_4N_2)_{0.28}$ (80% conversion): C, 79.77; H, 7.43; N, 3.27. Found: C, 80.67; H, 7.01; N, 3.27.

Example 6

Functional polymer that comprises repeat units having structures corresponding to end products of cycloaddition of polymeric 1-(vinylphenyl)ethylene repeat units with N-ethylmaleimide electron-poor alkene (7). By reaction of 2 with N-ethylamine. Beads of 0.32 $X_f$ polymer-supported bis-anhydride 2c derived from Amberlite® XAD-16 (1.00 g, 3.33 mmol anhydride) was added to 70 wt % aqueous ethylamine (2 mL, 30 mmol) and 8 mL THF, then heated 1 h at 40° C. The beads were then filtered and transferred to a 25 mL round bottom flask containing 10 mL o-xylene, and heated to 120° C. for 2 h, then filtered hot and washed several times with ethanol and ether. The beads were then dried in vacuo 24 h at 70° C., yielding 1.05 g of 7 as white beads: FT-IR as above, except for more significant peaks at 3400 (m, br) and 1870, and a broader one at 1790 cm$^{-1}$. Anal. Calcd for $(C_{10}H_{12})_{0.45}(C_{10}H_{10})_{0.23}$-$(C_{18}H_{14}O_6)_{0.05}$ $(C_{22}H_{24}O_4N_2)_{0.27}$ (84% conversion): C, 78.59; H, 7.19; N, 3.63. Found: C, 78.22; H, 7.22; N, 3.61.

Example 7

Functional polymer that comprises repeat units having structures corresponding to end products of cycloaddition of polymeric 1-(vinylphenyl)ethylene repeat units with maleimide electron-poor alkene (8). Beads of 0.18 $X_f$ polymer-supported bis-anhydride 2b derived from Amberlite® XAD-4 (1.00 g, 2.17 mmol anhydride) were suspended in 5 mL triglyme containing "99% grade" urea (0.70 g, 12 mmol) and heated to 150° C. for 1 hour, then filtered hot and washed with hot toluene and hot ethanol, then ether. The beads were dried in vacuo, yielding 0.93 g of 8 as light beige beads: FT-IR (Si wafer) 1782, 1716 cm$^{-1}$; $^{13}$C CP-MAS NMR δ 169 (DD), 145 (DD), 135 (DD), 127, 40, 30, 22, 35 15 (DD). Anal. Calcd for $(C_{10}H_{12})_{0.45}(C_{10}H_{10})_{0.37}$ $(C_{18}H_{14}O_6)_{0.08}(C_{18H16}O_4N_2)_{0.10}$ (56% conversion): N, 1.69. Found: N, 1.76.

Example 8

Functional polymer that comprises repeat units having structures corresponding to end products of cycloaddition of polymeric 1-(vinylphenyl)ethylene repeat units with hexachlorocyclopentadiene electron-poor alkene (9). Amberlite® XAD-16 beads of 0.35 $X_f$ polymeric 1-(vinylphenyl)ethylene-containing polymer 1c (4.0 g. 11.60 mmol) were soaked with 10 mL toluene, and hexachlorocyclopentadiene (4.1 g, 15.0 mmol) was then added. The mixture was heated for 16 h at 125° C., then filtered hot, and washed with toluene 6X, ethanol 4X then ether. The beads were then dried in vacuo 3 days at 75° C. until constant weight, yielding 5.50 g of 9 as tan beads: FT-IR (Si wafer) 1269, 1209, 1154, 1097, 1063 cm$^{-1}$. Anal. Calcd for $(C_{10}H_{12})_{0.45}(C_{10}H_{10})_{0.42}(C_{15}H_{10}Cl_6)_{0.13}$ (38% conversion): Cl, 16.70. Found: Cl; 16.75. These beads settled more quickly in methanol than beads of Amberlite® XAD-4 poly(divinylbenzene).

Example 9

Functional polymer that comprises repeat units having structures corresponding to end products of cycloaddition of polymeric 1-(vinylphenyl)ethylene repeat units with 3,6-di-2-pyridyl-1,2,4,5-tetrazine electron-poor alkene (10). Amberlite® XAD-16 beads of 0.35 $X_f$ polymeric 1-(vinylphenyl)ethylene-containing polymer 1c (2.0 g, 5.80 mmol) were soaked with 10 mL DMF containing 3,6-di-2-pyridyl-1,2,4,5-tetrazine (1.1 g, 6.0 mmol), degassed, and purged with $O_2$, then a few drops of conc. ammonium hydroxide were added. The mixture was stirred for 24 h at 25° C. during which the deep red colour changed to yellow, and until gas evolution ($N_2$) ceased, then filtered and washed with toluene 6X, ethanol 4X, then ether. The beads were then dried in vacuo 2 days at 35° C. until constant weight, yielding 3.00 g of 10 as very light yellow beads: FT-IR (Si wafer) 1269, 1209, 1154, 1097, 1063 cm$^{-1}$. Anal. Calcd for $(C_{10}H_{12})_{0.45}(C_{10}H_{10})_{0.02}(C_{15}H_{10}Cl_6)_{0.34}$ (98% conversion): mass increase: +1.00 g. Found: mass increase: +1.00 g. This functional polymer was able to chelate iron, nickel and copper ions out of aqueous solution to less than 1 mmol concentration.

Example 10

Functional polymer that comprises repeat units having structures corresponding to end products of cycloaddition of polymeric 1-(vinylphenyl)ethylene repeat units with maleic acid acyl-lipase electron-poor alkene (11). *Candida cylindricea* lipase (freshly precipitated from n-propanol) was suspended in 100 mM pH 7 aqueous phosphate buffer, and shaken with ethyl butyrate and beads of 0.18 $X_f$ polymer-supported bis-anhydride 2b derived from Amberlite® XAD-4, in the proportions of 100 mg enzyme: 4 mL buffer. 0.1 mL ethyl butyrate: 1 g polymer, at 22° C. for 12 hours. The mixture was then filtered, and the residue washed liberally with buffer. Assay of the filtrate for protein by the Peterson-modified Lowry method (Sigma Chemical Co. kit cat# P5656) indicated, by difference, a protein content in the residue of 45 mg/g polymer. Filtrate from washing this solid with 1% SDS/$H_2O$ showed no colour reaction with ninhydrin, indicating the lipase to have become covalently bound to polymer as 11b (unlike other enzyme merely precipitated and adsorbed onto Amberlite® XAD-16). As measured by titration with 0.100 N NaOH to pH 7.50 in a Radiometer RTS 822 pHstat on 0.5 M ester dissolved or suspended with 11b (22 mg total, 1 mg bound enzyme) in 10 mL of 10 mM pH 7 aqueous phosphate buffer, polymer-bound lipase lib catalyzed hydrolysis of esters at the rate of 2.00 μmol ester/min/mg enzyme for butyl acetate, 1.92 μmol/min/mg for ethyl acetate, and 0.28 μmol/min/mg for methyl acetate. After recovery by filtration and washing, recycled polymer-bound enzyme proved catalytically active in later hydrolyses.

What is claimed is:

1. A functional polymer that comprises repeat units having structures corresponding to end products of cycloaddition of polymeric 1-(vinylphenyl)ethylene repeat units with an electron-poor alkene.

2. A functional polymer of claim 1 wherein said polymeric 1-(vinylphenyl)ethylene repeat units arise from copolymerization of a monomer mixture that includes divinylbenzene.

3. A functional polymer of claim 1 wherein said electron-poor alkene is maleic anhydride.

4. A functional polymer of claim 1 wherein said electron-poor alkene is maleimide, or N-alkylmaleimide wherein "alkyl" is selected from methyl, ethyl, n-propyl, i-propyl, n-butyl, i-butyl, s-butyl or t-butyl.

5. A functional polymer of claim 1 wherein said electron-poor alkene is of the form X—CO—CH=CH—CO—Y, whose geometry is selected from cis and trans, and where X and Y are selected from Cl, O$^-$, OR$^1$ and NR$^1$R$^2$ where R$^1$ and R$^2$ are selected from H, Me, Et, nPr, iPr, nBu, iBu, sBu, tBu, an amino acid residue of a polypeptide, a carbohydrate residue of a polysaccharide, and a nucleotide residue of a polynucleotide.

6. A functional polymer of claim 1 wherein said electron-poor alkene comprises a conjugated diene capable of cisoid conformation.

7. A functional polymer of claim 6 wherein said electron-poor alkene is hexachlorocyclopentadiene.

8. A functional polymer of claim 6 wherein said electron-poor alkene is 3,6-di-2-pyridyl-1,2,4,5-tetrazine.

9. A method of preparing functional polymers, whereby polymeric 1-(vinylphenyl)ethylene repeat units are heated with an electron-poor alkene in the absence of free radicals so as to undergo cycloaddition with said electron-poor alkene.

* * * * *